United States Patent [19]
Nagano

[11] Patent Number: 5,222,412
[45] Date of Patent: Jun. 29, 1993

[54] CHANGE SPEED LEVER APPARATUS FOR USE IN BICYCLE

[75] Inventor: Masashi Nagano, Osaka, Japan

[73] Assignee: Shimano Industrial Co., Ltd., Osaka, Japan

[21] Appl. No.: 803,747

[22] Filed: Dec. 4, 1991

Related U.S. Application Data

[63] Continuation of Ser. No. 386,372, Jul. 28, 1989, abandoned.

[30] Foreign Application Priority Data

Jul. 29, 1988 [JP] Japan ................. 63-190952

[51] Int. Cl.⁵ .................................. F16C 1/10
[52] U.S. Cl. .......................... 74/502.2; 74/489; 74/523; 74/527
[58] Field of Search ............... 74/475, 489, 502.2, 74/527

[56] References Cited

U.S. PATENT DOCUMENTS

| | | | |
|---|---|---|---|
| 4,699,018 | 10/1987 | Tagawa | 74/475 |
| 4,768,395 | 9/1988 | Tagawa | 74/527 |
| 4,876,913 | 10/1989 | Romano | 74/483 |
| 4,885,951 | 12/1989 | Desenclos et al. | 74/502.2 |
| 4,920,818 | 5/1990 | Nagaano | 74/502.2 X |
| 4,930,368 | 6/1990 | Nagano | 74/475 |

FOREIGN PATENT DOCUMENTS

| | | | |
|---|---|---|---|
| 0067692 | 12/1982 | European Pat. Off. | 74/502.2 |
| 2480223 | 10/1981 | France | 74/502.2 |
| 2523066 | 9/1983 | France | 74/502.2 |
| 2594404 | 8/1987 | France | 74/502.2 |
| 61-143275 | 6/1986 | Japan | 74/502.2 |
| 2081426 | 2/1982 | United Kingdom | 74/502.2 |
| 2169065 | 7/1986 | United Kingdom | 74/502.2 |

Primary Examiner—Vinh T. Luong
Attorney, Agent, or Firm—Edwin E. Greigg; Ronald E. Greigg

[57] ABSTRACT

A change-speed lever apparatus for use on a bicycle, comprises: a fixed member; a winding member pivotably supported to the fixed member and urged toward a cable-winding direction, the winding member winding a change-speed cable; a control lever operable to pivot the winding member only in the cable-winding direction via a one-way mechanism with an operation thereof in a forward direction against the urging force. A position-maintaining mechanism having an engaging member and a plurality of engaging portions operable to stepwisely and elastically engage with the engaging member, the mechanism maintaining a position of the winding member; and a release mechanism for releasing the position-maintaining condition of the winding member by the position-maintaining mechanism by releasing the engagement between the engaging member and the one engaging portion and for effecting a change-speed operation by causing the winding member to pivot in the cable-rewinding direction with the cable-rewinding urging force.

17 Claims, 7 Drawing Sheets ically engage with the engaging member, the mechanism
CHANGE SPEED LEVER APPARATUS FOR USE IN BICYCLE This is a continuation of copending application Ser. No. 07/386,372 filed on Jul. 28, 1989 abandoned.

BACKGROUND OF THE INVENTION

1. Field of the Invention

The present invention relates to a change-speed lever apparatus for use in a bicycle, and more particularly to a change-speed lever apparatus of the above-noted type including a fixed member, a winding member pivotably supported to the fixed member and for winding, a change-speed cable urged toward a cable-winding direction and a control lever operable to pivot the winding member only in the cable-winding direction via a oneway mechanism with an operation thereof in a forward direction against the urging force, i.e. winding direction of the cable and operable also to return by means of return-urging means.

2. Description of the Related Arts

A conventional bicycle change-speed lever apparatus is known from e.g. a Japanese laid-open patent No. 61-143275. According to this prior apparatus, the winding has its position maintained by means of a frictional force, and a pair of oneway mechanisms each comprising a ratchet mechanism are disposed as opposed to each other between the control lever and the winding member, with the ratchet mechanism having a projectable and recedable claw portion. The prior apparatus further includes return-urging means operable to return the control lever to an intermediate position between its forward stroke end and a reverse stroke end when the winding member is pivoted in the cable-winding direction or cable-rewinding direction with a forward or reverse operation on the control lever.

With the above-described conventional lever apparatus, however, if the apparatus is attached adjacent the grip portion of the steering handle bar of the bicycle and for providing a rather large number of speeds such as five or six steps, the change-speed lever apparatus necessarily has a significantly long total operation stroke, so that its control lever needs to be operated in the forward and reverse direction by a thumb and an index finger of the bicycle rider, respectively. This means that the rider's index finger, which contributes importantly to the handle gripping force, has to move away from the grip portion of the handle bar in order to effect a change-speed operation. Needless to say, such insufficient grip condition should be avoided for safety of the bicycle rider.

In addition, if both the thumb and the index finger have to be available for a change-speed operation, the control lever must be attached to the upside portion of the steering handle, which means that the thumb when used for the change-speed operatrion must be clumsily moved from its downside gripping position up to the upside position of the lever. Thus, in this case, the gripping force of the thumb, which is also important for the rider's handle gripping, becomes insecure.

Moreover, since the winding member has its position maintained in a stepless manner, the rider often fails to recognize what speed position he is currently in.

In view of the above-described state of the art, the primary object of the present invention is to provide an improved change-speed lever apparatus for use in a bicycle, which always permits the rider to grip the steering handle with sufficient and secure gripping force and which always permits him to recognize the present speed position.

SUMMARY OF THE INVENTION

In order to accomplish the above-noted object, a change-speed lever apparatus of the invention for use in a bicycle, comprises: a fixed member; a winding member pivotably supported to the fixed member and urged toward a cable-winding direction, the winding member winding a change-speed cable; a control lever operable to pivot the winding member only in the cable-winding direction via a oneway mechanism with an operation thereof in a forward direction against the urging force, i.e., winding direction of the cable and operable also to return by return-urging means; a position-maintaining mechanism having an engaging member and a plurality of engaging portions operable to stepwise and elastically engage with the engaging member, the mechanism maintaining a position of the winding member; and a release mechanism for releasing the position-maintaining condition of the winding member by the position-maintaining mechanism by releasing the engagement between the engaging member and the one engaging portion and for effecting a change-speed operation by causing the winding member to pivot in the cable-rewinding direction with the cable-rewinding urging force.

According to the above-defined construction, with a forward operation on the control lever, the winding member is pivoted to wind the change-speed cable and the winding member has this cable-wound position thereof maintained by the engagement between the engaging member and the engaging portion in the position-maintaining mechanism. Then, if this engagement between the engaging member and the engaging portion is released with an operation on the release mechanism, the winding member, which is urged in the cable-rewinding direction, may be pivoted in this cable-rewinding direction.

The above cable-rewinding operation can be effected merely by releasing the engagement between the engaging member and the engaging portion and thus requires only a very short operation stroke. And, such short operation stroke permits the rider to conveniently use any finger for the release operation without deterioration in the handle gripping condition in the change-speed operation.

Furthermore, since the engagement between the engaging member and the engaging portion is effected stepwise to provide the rider with a click operation feel, the rider may reliably recognize the present speed step position.

According to one preferred embodiment of the present invention, the apparatus as described above, further comprises: a release lever operatively connected with the release mechanism; and a limiting mechanism for limiting an amount of pivotal motion of the winding member in the cable-rewinding direction with an operation on the release lever.

With the above-described limiting mechanism, the winding member may be operated stepwise in the cable-rewinding direction also.

Further, if the control lever is adapted so as to act also as the above-described release lever, the operations of the winding member in the two opposite directions may be carried out by a single finger, whereby the controllability of the bicycle change-speed lever apparatus of the invention may be further improved.

Further and other objects, features and effects of the invention will become apparent from the following more detailed description of the embodiments of the invention with reference to the accompanying drawings.

BRIEF DESCRIPTION OF THE DRAWINGS

FIGS. 1 through 10 illustrate preferred embodiments of the present invention; in which, FIG. 1 is a partially cutaway cross section showing a change-speed lever apparatus according to one preferred embodiment of the invention, FIG. 2 is a plane view of the same, FIG. 3 is a partially cutaway cross section taken along a line 3—3 of FIG. 1, FIG. 4 is a partially cutaway cross section taken along a line 4—4 of FIG. 1, FIGS. 5 and 6 are views illustrating operational conditions, FIG. 7 is a view showing the apparatus of FIG. 1 attached to a bicycle, and FIGS. 8 through 10 illustrate alternate embodiments of the invention, respectively.

DESCRIPTION OF THE PREFERRED EMBODIMENTS

Preferred embodiments of the present invention will be particularly described hereinafter with reference to the accompanying drawings.

Figure 7:
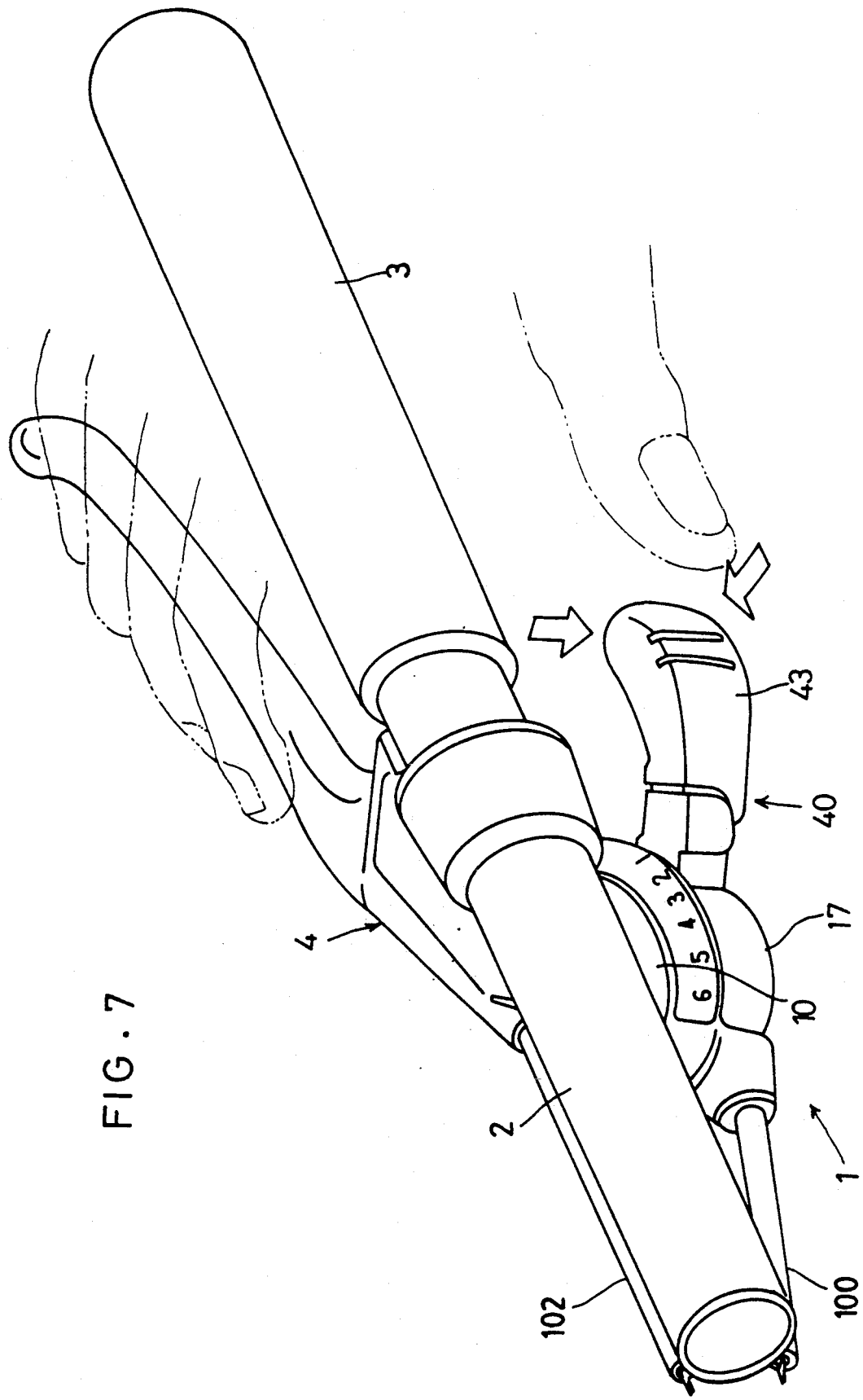

A bicycle change-speed lever apparatus 1 to which the invention relates is adapted mainly for use with a five to six step speed rear derailleur. As shown in FIG. 7, the change-speed lever apparatus 1 is attached to the vicinity of a grip portion 3 of a steering handle bar 2, such that its control lever 40 may be operated by a thumb of a rider's hand while gripping the grip portion 3. In operation of this lever apparatus 1, as will be described more particularly later, with a forward operation on a control portion 43 of the lever 40 from its home position in the bending direction of the thumb on the horizontal plane, a winding member 20 to be described later is pivoted in a cable-winding direction (to be briefly referred to as the winding direction hereinafter) so as to wind a change-speed cable 100 operatively connected with the apparatus 1 by a predetermined amount. Reversely, with a vertical release operation on the control portion 43, the winding member 20 is pivoted in a cable-rewinding direction (to be briefly referred to as the rewinding direction hereinafter) to rewind the cable by the predetermined amount.

Though unillustrated, the rear derailleur is operable to effect a change speed through a movement of a chain guide by causing the chain guide to pivot relative to a fixed member on the bicycle body side via a quadruple link mechanism. In this rear derailleur, the chain guide is normally positioned at a high-speed sprocket by means of an urging force of a derailleur spring attached to the link mechanism. Then, if the quadruple link mechanism is pulled via the cable against the urging force of the spring, the derailleur effects a change speed to a lower speed position.

A fixed member 10 of the change-speed lever apparatus 1 is fixedly secured to a base 12, which is fixed to the handle bar 2, by tightening a first shaft 11 acting as a cylindrical support shaft via a tightening screw 13. The base 12, as illustrated in FIG. 7, is formed integrally and continuously with a bracket of a brake lever device 4 fixed to the handle bar 2 which operates brake cable 100.

Between the first shaft 11 and the base 12, there are provided a plurality of engaging projections and engaging recesses corresponding thereto, such that through a selective engagement between the same the first shaft 11 has its peripheral position variable relative to the base 12. At a leading end and outer peripheral surface of the first shaft 11, there are formed a plurality of concave grooves 14 and a threaded groove. Then, with a screw-engagement of a nut 15 into this threaded groove, the winding member 20 and a control lever element 41 are detachably supported to the first shaft 11. Further, at the concave groove 14 of the first shaft 11, there is provided a spring-receiver plate 16 for receiving, between the plate 16 and the winding member 20, a rewinding spring 21 for urging the winding member 20 in the rewinding direction. Reference numeral 17 denotes a bowl-shaped cover for covering the base end portions of the winding member 20 and the control lever 40.

Figure 1:
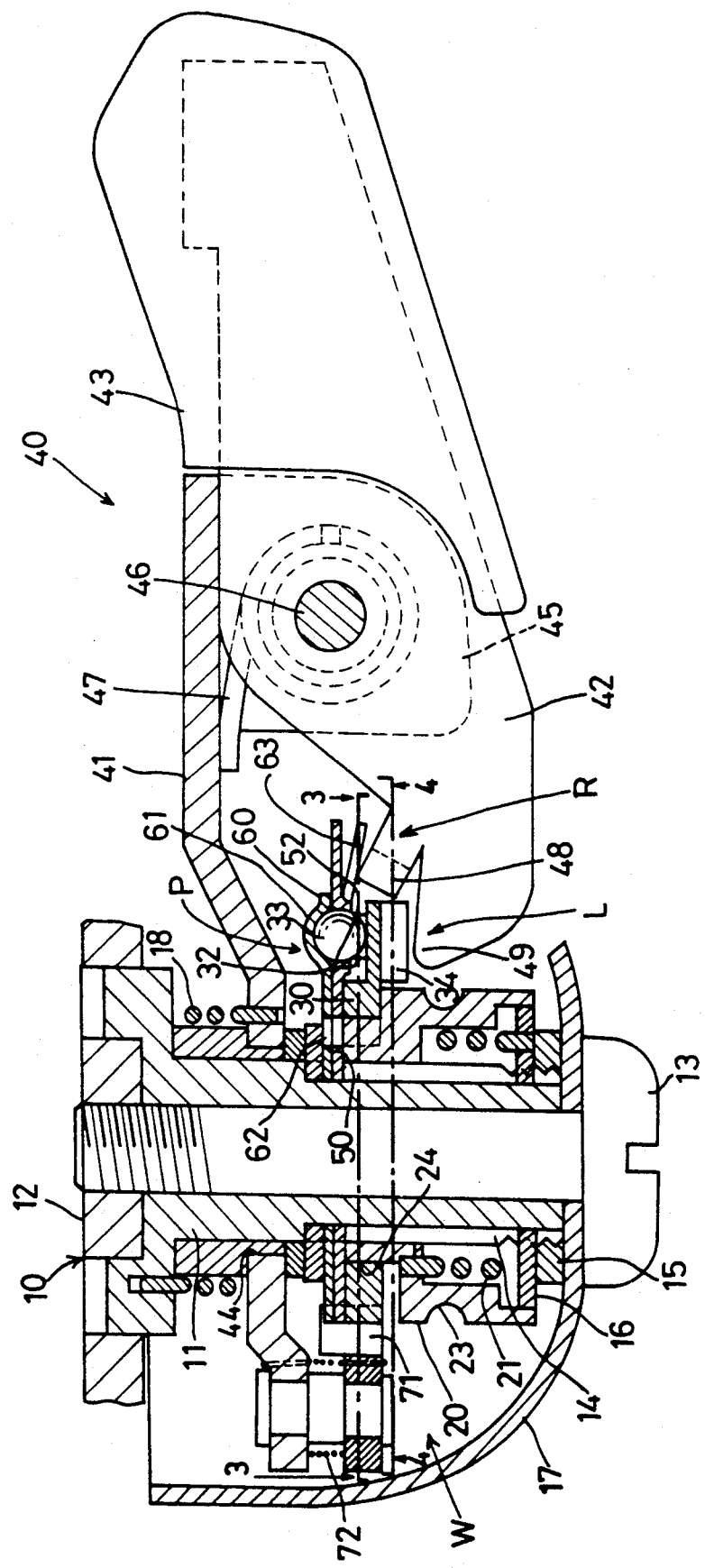
Figure 3:
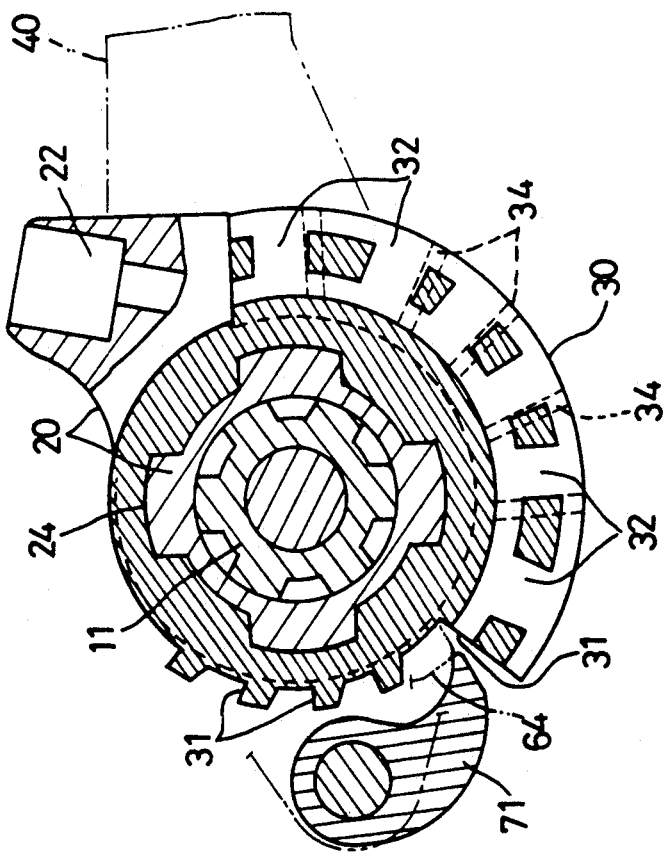

As shown in FIGS. 1 and 3, the winding member 20 is formed as a cylindrical structure having a cable-stopper portion 22 at one lateral side thereof and defines at an intermediate position in its outer periphery a cable-guide groove 23 formed continuous with the cable-stopper portion 22 and along the periphery of the winding member 20. Further, the winding member 20 includes, at one end thereof along the first shaft 11, an engaging portion 24 having a plurality of engaging projections disposed with a predetermined peripheral interdistance therebetween. Then, as this engaging portion 24 comes into engagement with one of the engaging holes of a disc-shaped positioning member 30 to be described later, the winding member 20 and this positioning member 30 come into an unrotatable connection with each other.

The control lever 40 includes the control lever element 41 formed of a metal plate, a release lever element 42 formed also of a metal plate and a control portion 43 formed of a resin material and at the leading end of the release lever element 42. The control lever element 41 defines at an intermediate position thereof a first shaft hole 44 for engaging with the first shaft 11. Further, the lever element 41 forms, at one end thereof, a pair of connecting pieces 45 extending along the axial direction of the first shaft hole 44. Then, the release lever element 42 is pivotably supported to the connecting pieces 45 by a predetermined range via a second shaft 46 disposed normal to the axis of the first shaft hole 44. That is to say, as the first shaft 11 and the second shaft 46 are disposed normal to each other, with a horizontal pivotal operation on the control lever 40, the entire control lever 40 pivots only about the first shaft 11; whereas, with a vertical pivotal operation on the control lever 40, the release lever element 42 along pivots about the second shaft 46.

Between the release lever element 42 and the control lever element 41, there is interposed a release lever spring 47 for urging the release lever element 42 in its return direction, such that the respective lever elements 41 and 42 are normally maintained at horizontal postures. Further, the release lever element 42 has its upper end face contacting a lower end face of the control lever element 41 thereby to set a home position of the release lever element 42.

Figure 2:
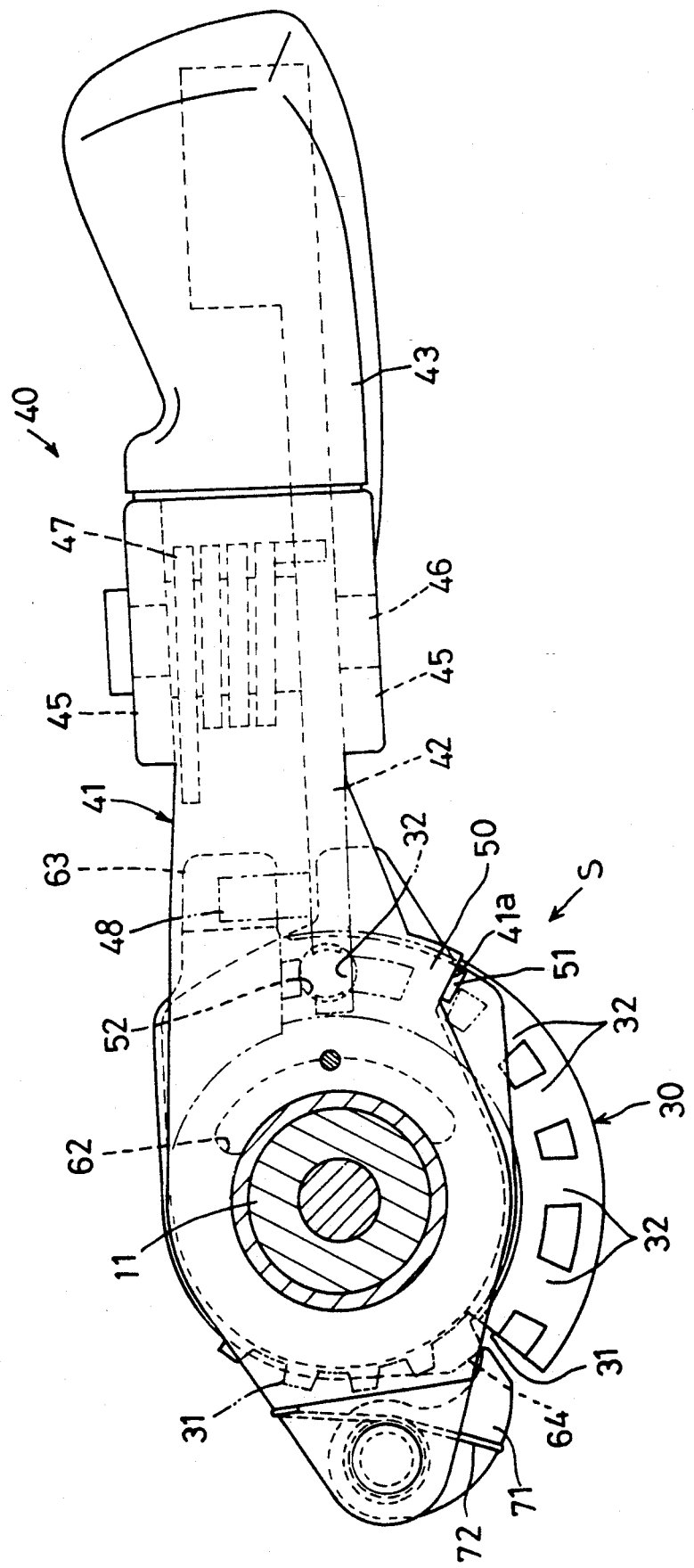
Figure 5:
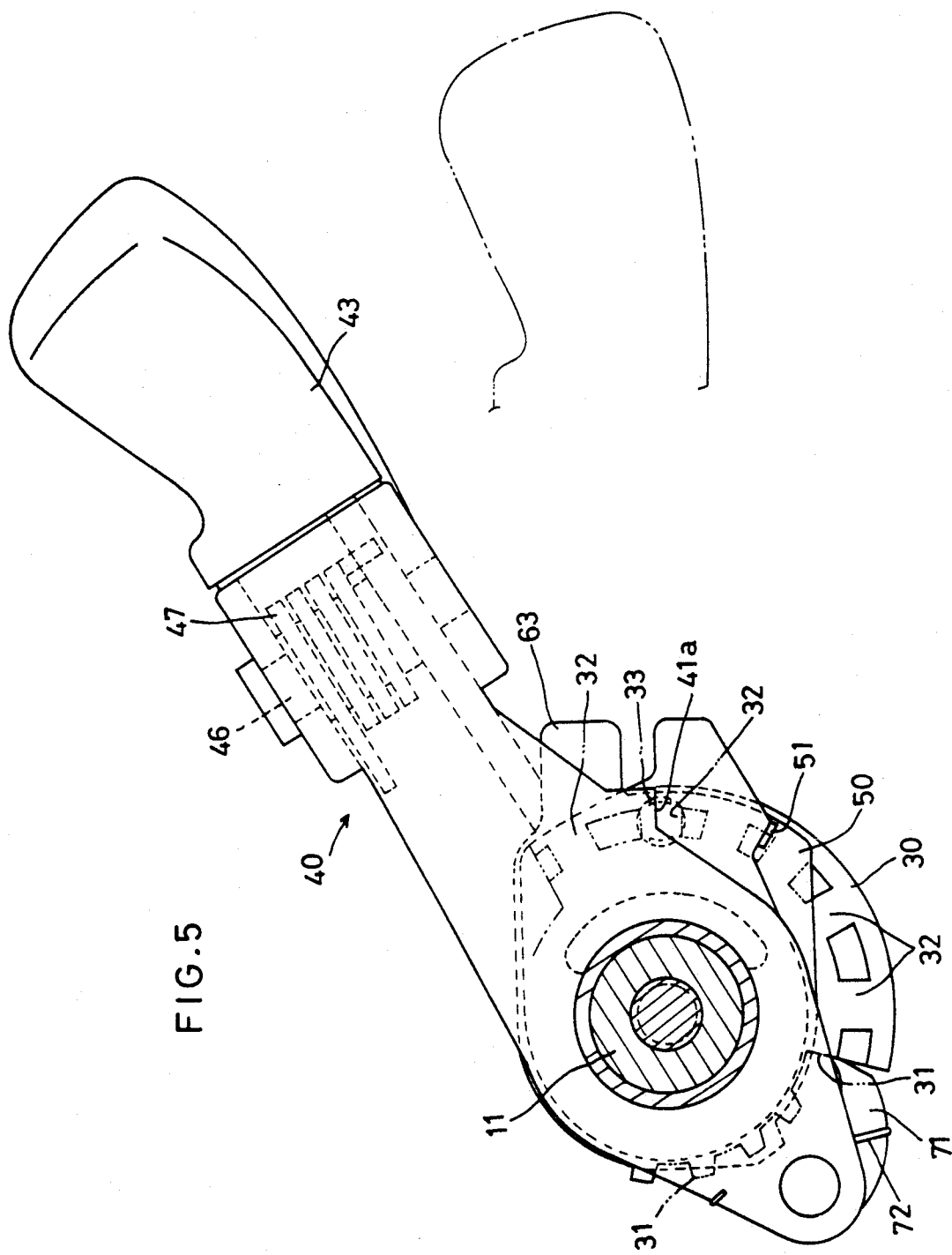

As shown in FIGS. 2 and 5, a position setting mechanism S is provided for setting a home position of the control lever element 41, in which mechanism a plate-type position setting element 50 having an upwardly projecting setting portion 51 is unrotatably fitted on the first shaft 11, such that a contact portion 41a of the control lever element 41 urged by the lever spring 18 comes into contact with the setting portion 51 to be stopped at this home position. Incidentally, this setting portion 51 of the position setting member 51 is formed by bending a part of the position setting member 50.

As shown in FIGS. 1 through 5, a oneway mechanism W is provided between the the positioning member 30 pivotable together with the winding member 20 and the control lever element 41 so as to permit pivotal motion of the winding member 20 only in the winding direction. More particularly, this oneway mechanism W pivotably supports, at one end of the control lever element 41, a claw-shaped transmitting element 71 and includes a claw spring 72, FIGS. 1 and 2, disposed between the transmitting element 71 and the control lever element 41 and adapted for unidirectionally urging the transmitting element 71 and further includes a plurality of peripherally dispersed transmitted portions 31 formed at a portion of the outer periphery of the positioning member 30 and adapted for transmitting a control force from the control lever element 41 as coming into engagement with the transmitting element 71 only with a return operation of the control lever element 41.

Further, as shown in FIGS. 1 and 2, there is provided a position maintaining mechanism P. This mechanism P includes concave portions 32 formed of a plurality of projections peripherally dispersed with a predetermined interdistance therebetween on the upside face of the positioning member 30 and a ball-shaped engaging member 33 for selective engagement with one of the concave portions 32, with the engaging member 33 being urged downwardly by means of a plate spring 60. The number of the concave portions 32 corresponds to the number of speed steps provided by the change-speed lever apparatus of the invention. The engaging ball member 33 has its movement regulated as being received into a through hole 52 defined in the position setting element 50, such that the engaging ball member 33 fixedly maintains the position of the winding member 20 as coming into engagement with one of the concave portions 32. The plate spring 60 includes a semi-spherical pressing portion 61 for receiving a part of the engaging ball member 33, with the ball member 33 being urged along the axis of the first shaft 11 by a bending arrangement of the plate spring 60 in the axial direction of the shaft 11. Also, the pressing plate spring 60 defines a peripherally elongated slot 62 adapted for allowing the deformation of this plate spring and formed at an intermediate position between the engaging hole and the pressing portion 61.

For releasing the position-maintaining condition of the winding member 20 by the above-described position-maintaining mechanism P, there is provided a release mechanism R. This release mechanism R includes a release-portion 48 formed at the leading end of the release lever element 42 and an abutment portion 63 formed by a part of the plate spring 60 projected in opposition to the release portion 48. This release portion 48, with a depressing operation on the release lever element 42, pushes up the abutment portion 63 to cause the plate spring 60 to elastically deform in the axial direction, thereby to weaken the pressing force on the engaging ball member 33 and consequently to permit a movement of this member 33 away from the concave portion 32. Further, the plate spring 60 includes a release cam 64 projected in opposition to the abutment portion 63 and for releasing the engagement between the transmitting element 71 and the transmitted element 31 when the control lever element 41 has returned to its home position.

Figure 4:
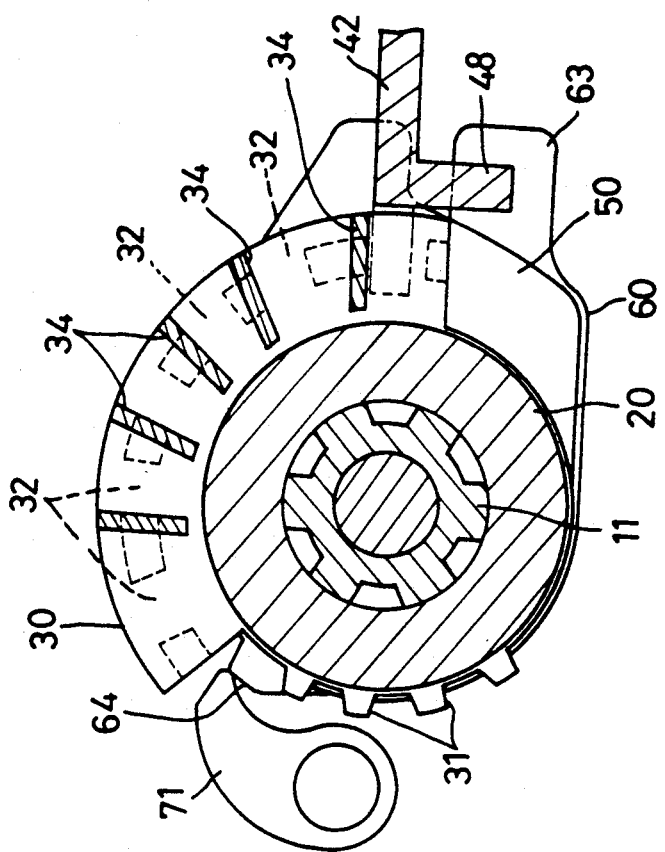

As shown in FIGS. 1 and 4, a limiting mechanism L is provided for limiting the pivotal amount in the rewinding direction of the winding member 20 with a release operation of the release mechanism R to one pitch of the concave portions 32. This limiting mechanism L includes a plurality of stopper portions 34 projecting from the lower face of the positioning member 30 towards the outside in the direction of thickness of the same and stopper pieces 49 provided at the leading end of the release lever element 42 and extending downwardly relative to the stopper portions 34. These stopper pieces 49 are provided so as to correspond to the respective gaps between adjacent pairs of the concave portions 32. With a depressing operation on the release lever element 42, the stopper pieces 49 move in between adjacent pairs of stopper portions 34 to stop one of the same 34, thereby to limit the rewinding-direction-wise pivotal amount of the winding member 20 not to exceed one pitch of the concave portions 32.

Next, operations of the above-described construction will be specifically described.

FIG. 2 shows a highest speed condition, in which the control lever element 41 is urged by the lever spring 18 so that the contact portion 41a of this control lever element 41 is placed in contact with the setting portion 51 of the position setting member 50 whereby the entire control lever 40 is stopped at its home position.

First, from the above highest speed condition shown in FIG. 2, a speed reducing operation is carried out as follows.

When a thumb of the rider's hand holding the handle grip operates the control portion 43 of the control lever 40 to pivot the same counterclockwise in FIG. 2, as illustrated in FIG. 5, the transmitting element 71 comes into engagement with one of the transmitted elements 31 of the positioning member 30, thereby to transmit the forward control force from the control lever 40 to the winding member 20 via the positioning element 30. Then, as this winding member 20 is pivoted in the winding direction, the change-speed cable is pulled. In this operation, one step speed reduction is realized when the amount of the forward pivotal motion of the control lever 40 has reached one stroke amount corresponding to one pitch of the concave portions 32, and two step speed reduction is realized when said amount has reached two stroke amount of the same. In this way, a change-speed operation up to three steps is possible stepwise or overridingly with a single thumb-using operation. For a change-speed operation over four steps, the control lever 40 is temporarily returned to its home position, then, the operation is possible stepwise or overridingly by again operating the lever 40 in the forward direction.

When the above operation is completed at the desired lower speed position, the engaging ball member 33 is engaged with the desired concave portion 32 as illustrated in FIG. 5 so as to prevent return pivotal movement of the winding member 20, whereby this low speed position may be maintained reliably. Further, when the engaging member 33 comes into engagement with the concave portion 32, the plate spring 60 elastically resides to sharply decrease the load acting on the control lever element 41, and this sharp drop in the load provides a clicking feel to the rider's hand operating the lever element 41 for each change-speed operation. Accordingly, the rider may conveniently keep aware of his change-speed operation through the clicking feel.

After completion of the above-described change-speed operation, if the control portion 43 is released from the pressing force, the control lever element 41 pivotably returns (clockwise in FIG. 2) by the urging force of the lever spring 18, and as the contact portion 41a of the setting portion 51 come into contact with each other, the control lever 40 is returned and stopped at its home position ready for a next change-speed operation, as illustrated in FIG. 2.

As described above, if the lever apparatus is adapted for providing 5 to 6 speed steps, a change-speed operation from a high speed position to a low speed position is readily possible with the two step horizonta operations on the control lever 40 by using the rider's thumb.

Second, a change-speed operation from a low speed position illustrated in FIG. 5 to a high speed position will be particularly described.

Figure 6:
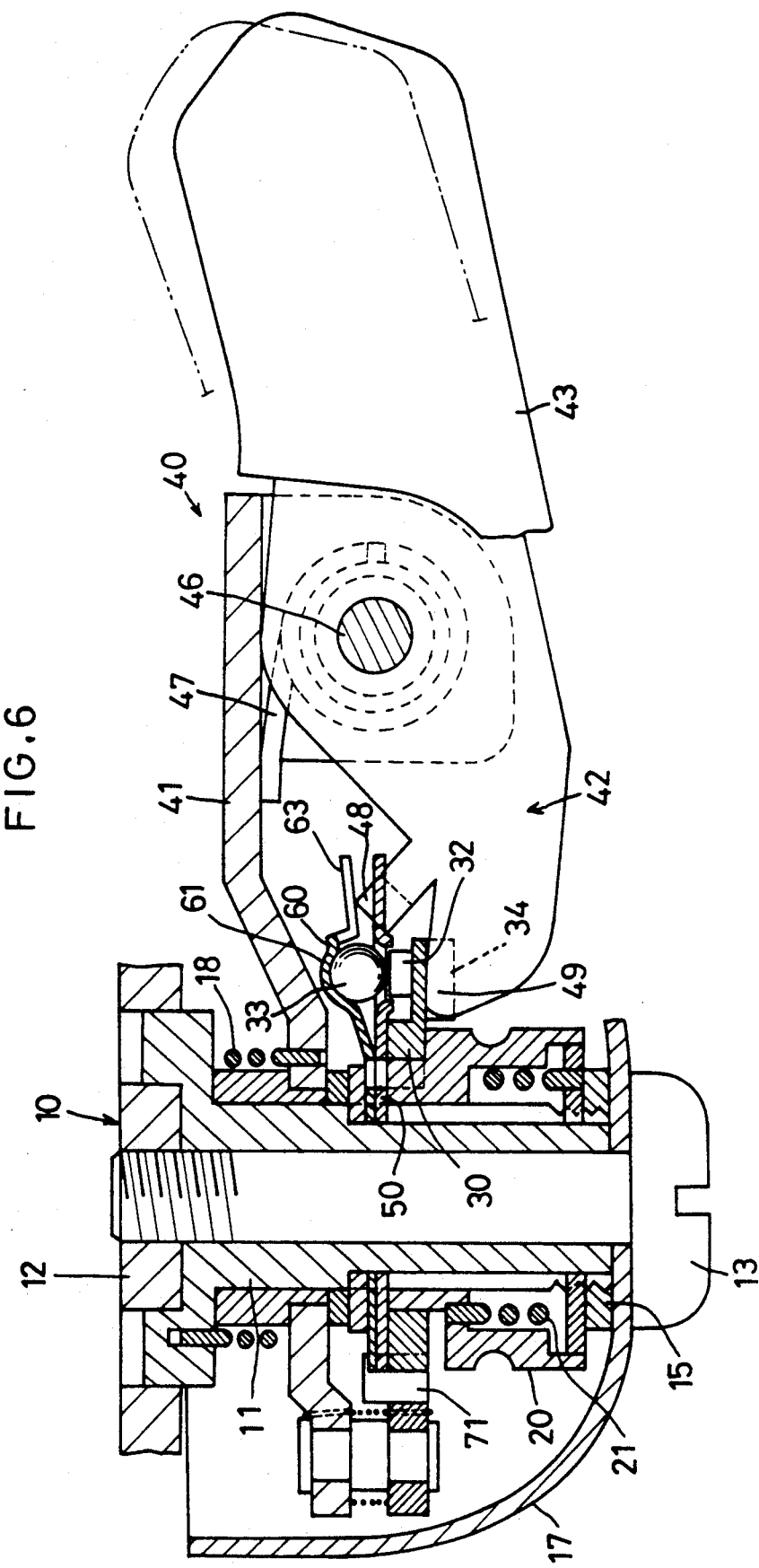

As illustrated in FIG. 6, with a downward pressing operation on the control portion 43 of the control lever 40 which is currently placed at its home position, the release portion 48 of the release lever element 42 pushes up the abutment portion 63 of the plate spring 60. With this release operation, the plate spring 60 elastically deforms along the first shaft 11 thereby to release the urging force applied on the engaging ball member 33. Then, the winding member 20, which has had its position released in the above manner, pivotably returns in the rewinding direction by the urging force of the rewinding spring 21. In this operation, as the engaging piece 49 of the release lever element 42 stops one engaging portion 34 of the positioning member 30, the pivotal amount of the return motion of the winding member 20 by the rewinding spring 21 is effectively limited so as not to exceed one pitch amount of the concave portions 32.

When the downward pressing on the control portion 43 is ceased, the release lever element 42 pivotably returns by the urging force of the release lever spring 47, thereby to release the engagement between the engaging piece 49 and the engaging portion 34. Simultaneously therewith, the plate spring 60 elastically resides to urge the engaging ball member 33 towards the concave portion 32, and the winding member 20 and the positioning member 30 effect a further reverse pivotal movement by a small amount by the force of the rewinding spring 21, whereby the engaging ball member 33 comes into engagement with the concave portion 32 of one lower step position. As this engagement prevents a further reverse pivotal motion of the winding member 20 by the rewinding spring 21, this one-step-higher speed position may be reliably maintained. Further, in this case also, when the engaging member 33 comes into engagement with the concave portion 32, the pressing spring 60 elastically resides to sharply decrease the load acting on the control lever element 41, and this sharp drop in the load provides a clicking feel to the rider's hand operating the lever element 41 for each change-speed operation.

As illustrated in FIG. 2, the returned release lever element 42 is stopped at its home position for a next change-speed operation, as contacting the control lever element 41. Then, if this release lever element 42 currently stopped at the home position is again pressed downwardly, in the same manner as described above, the engagement between the engaging ball member 33 and the concave portion 32 is released, and the winding member 20 pivotably returns by the force of the rewinding spring 21, thereby to again release the change-speed cable for a further change-speed operation into one-step-higher speed position.

ALTERNATE EMBODIMENTS

Some alternate embodiments of the present invention will be specifically described next.

(I) In the previous embodiment, the winding member 20 is pivotably returned by the force of rewinding spring 21. Instead, this member 20 may be returned by utilizing, e.g. the urging force of the derailleur spring attached to the derailleur. With this alternate arrangement, it becomes possible to eliminate the rewinding spring disposed between the winding member 20 and the spring receiver plate 16 of the fixed member 10.

(II) In the previous embodiment, the concave portion 32 and the engaging member 33 of the position maintaining mechanism P are opposed to each other in the axial direction of the first shaft 11. Instead, the same way may be opposed to each other in the radial direction of this first shaft 11.

(III) It is conceivable to fixedly secure the positioning member 30 to the fixed member 10 while arranging the engaging member 33 so as to pivotable in unison with a pivotal motion of the winding member 20.

(IV) Of the positioning member 30 and the engaging member 33, it is conceivable to form fixing portions of the same integrally with the fixed member 10 while forming pivotal portions of the same integrally with the winding member 20.

Figure 8:
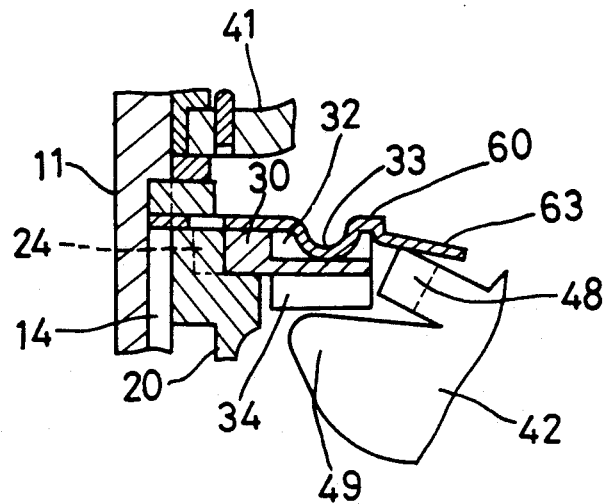

(V) In place of the rolling element such as the ball type engaging member 33 employed in the previous embodiment, this engaging member 33 may be formed e.g. by effectively utilizing the pressing spring 60 as illustrated in FIG. 8. That is, in this arrangement, the pressing portion 61 of the pressing spring 60 is provided with a bulging part projecting towards the concave portions 32 and this bulging part acts as the engaging member 33.

Figure 9:
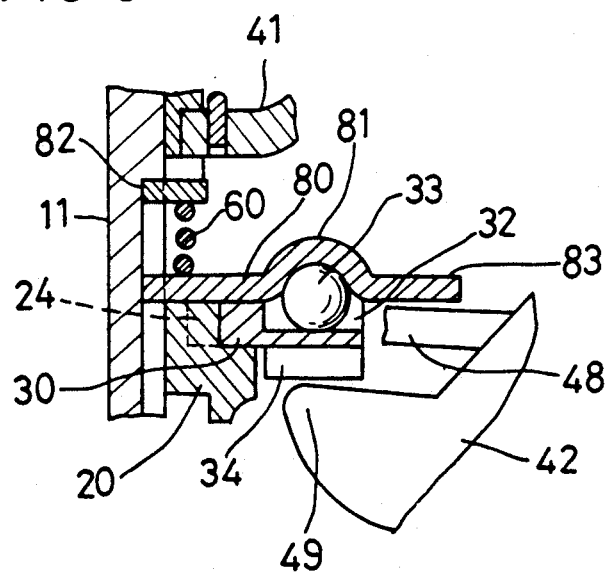

(VI) In the previous embodiment, the spring for pressing the engaging member 33 is formed of a plate type spring. Instead, as illustrated in FIG. 9, the same may be formed of a coil type spring 60. In this case, the engaging member 33 is supported to a semi-spherical holding portion 81 of a disc type holding meber 80, and the coil spring 60 is disposed between the holding member 80 and a spring receiver 82 of the first shaft 11, such that the coil spring 60 may be elastically deformed with a movement of the holding member 80 in the axial direction of the first shaft 11 by an operation on the release lever element 42.

Further, in this arrangement of FIG. 9, for example, an abutment portion 83 is provided in the outer periphery of the holding member 80 while the release lever element 42 is provided with a fork-shaped release portion 48 contactable with the abutment portion 83.

Figure 10:
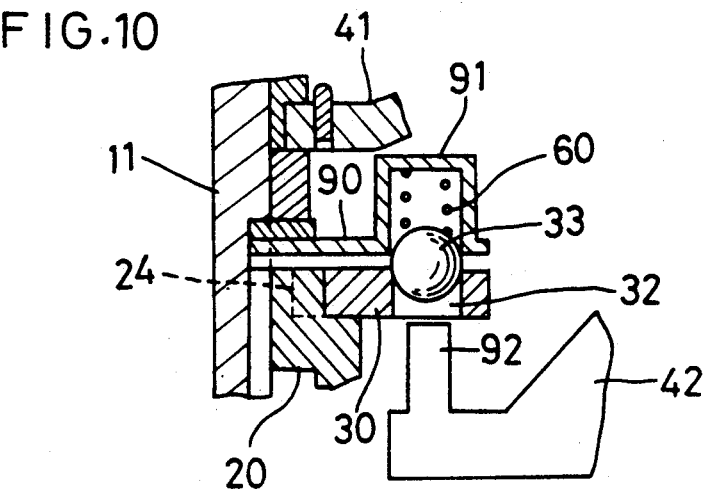

(VII) If the coil type spring 60 is employed as the spring for pressing the engaging member 33, as illustrated in FIG. 10, the first shaft 11 supports a holding member 90 having a bottom-equipped holding portion 91 for receiving the engaging member 33, with the holding portion 91 holding the engaging member 33 and the coil spring 60, and the engaging portion 32 is formed of a through hole. Whereas, the release lever element 42 includes, in place of the release portion 48 and the stopper piece 49, a plurality of projecting release stopper pieces 92 insertable into the respective engaging portions 32. Thus, with a forward operation on the release lever element 42, the release stopper pieces 92 are inserted into the respective engaging portions 32, such that one of these control portions releases the engagement between the engaging member 33 and the engaging portion 32 and then the winding member 20 is returned by the urging force of the rewinding spring 21.

(VIII) In the previous embodiment, the release lever element 42 in the release mechanism R and the limiting mechanism L is pivotably supported to the control lever element 41. Instead, the release lever element 42 may be pivotably supported to the side of fixed member 10.

(IX) In the previous embodiment, the release mechanism R and the limiting mechanism L include the release lever element 42. Instead, it is also conceivable to eliminate this release lever element 42 and to provide the first shaft hole 44 of the control lever element 41 with a play for the first shaft 11, such that the hole 44 may incline toward the axial (i.e. vertical) direction of the shaft 11. Still alternately, the control lever element 41 may support a control pin or control lever urged towards its returning direction by means of a spring, such that this control pin or control lever may act on the control lever element 41 to cause the plate spring 60 to elastically deform, thereby moving the engaging member 33 to release the engagement between this engaging member 33 and the concave portion 32. Varied and many other modifications in the construction of the release mechanism R and limiting mechanism L would be obvious for those skilled in the art.

(X) In the previous embodiment, in a change-speed operation from a low speed position to a higher speed position, the engaging piece 49 of the release lever element 42 comes into engagement, for each each of the concave portions 32, with the stopper portion 34 so as to limit the amount of return motion of the winding member 20, whereby the release lever element 42 must be operated in the forward direction by a plurality of steps which number corresponds to the number of steps of the change-speed operation. Instead, it is also conceivable to eliminate the engaging portion 34 of the limiting mechanism L and to control the degree of engagement between the engaging member 33 and the concave portion 32 by varying the amount of operation on the release lever element 42, such that the winding member 20 may be pivoted stepwise or through a plurality of steps at one time, for the change-speed operation.

(XI) The setting portion 51 for the setting the home position of the control lever element 41 may be formed integrally with the fixed member 10.

(XII) The base 12 may be directly fixed to the steering handle bar 2 though a band element or without the same.

(XIII) The change-speed lever apparatus of the present invention may be used also with a front derailleur, instead of the use with the rear derailleur.

(XIV) The oneway mechanism W employed in the previous embodidment includes the claw-shaped transmitting element 71 and the transmitted portion 31 defined in the outer peripheral face of the positioning member 30. Alternately, the oneway mechanism W may utilize a friction force.

(XV) In the previous embodiment, the control lever element 41 shares the same pivot shaft 11 with the winding member 20. Instead, the the pivot shaft 11 of the former may be provided independently of that of the latter.

(XVI) The attaching orientation of the first shaft 11 is not limited to the vertical direction disclosed in the previous embodiment. This shaft 11 may be attached with any orientation most convenient for the rider's thumb or some other finger to operate the control lever 40 when his hand grips the grip portion 3. For instance, the easy operation is also possible by disposing the first shaft 11 parallel with the axial disposing the first shaft 11 parallel with the axial direction of the steering handle bar 2 while disposing the second shaft 46 along the travelling direction of the bicycle.

(XVII) The extending position of the control lever 40 may vary depending on the extending direction of the grip portion 3. For instance, if the lontitudinal axis of the grip portion 3 of the handle bar 2 is aligned with the travelling direction of the bicycle, the interdigital pads of the rider's hand gripping the grip portion 3 are positioned on the outerside face of the grip portion 3 along the outerside of the bicycle body. Thus, in this case, the control lever 40 may extend on the innerside face of the grip portion 3 facing the rider.

What is claimed is:

1. A control apparatus for controlling a bicycle change-speed device which includes a change-speed cable, said control apparatus comprising:
   a fixed member;
   a winding member which pivots on said fixed member for winding said change-speed cable;
   a control lever which moves in a first plane for rotating the winding member only in a cable-winding direction through a one-way mechanism when said control lever is oscillated in a forward direction for winding said change-speed cable, a return-urging means for returning said control lever to an operation starting position after each cable-winding operation, said control lever being displaced within a second plane;
   a position-maintaining mechanism includes a positioning member which positions said winding member at one of a plurality of positions, said position-maintaining mechanism having an engaging member and a plurality of engaging portions which elastically engage with said engaging member; said engaging member and engaging portions being relatively moved between a position for engaging the engaging member with the engaging portions and a position for disengaging the engaging member from the engaging portions, said engaging portion being formed of a plurality of concave portions formed in said positioning member, said engaging member having a convex semi-spherical face contacting said engaging portion, said winding member being maintained in position at said engaging position; and
   a release mechanism for releasing a position-maintaining condition of said winding member by said position-maintaining mechanism;
   wherein said control lever is displaced in said second plane to allow said position-maintaining mechanism to be operated for releasing the position-maintaining condition of said winding member.

2. A control apparatus as claimed in claim 1 wherein said first plane if substantially normal to an axis of said winding member.

3. A bicycle change-speed lever apparatus as defined in claim 1, wherein said positioning member rotates in unison with said winding member.

4. A bicycle change-speed lever apparatus as defined in claim 3, wherein said stopper portions are formed in said positioning member.

5. A bicycle change-speed lever apparatus as defined in claim 4, wherein said stopper portions are formed of a plurality of projections.

6. A bicycle change-speed lever apparatus as defined in claim 5, wherein said engaging portion and said stopper portions are provided in an upper face and a lower face of said positioning member, respectively.

7. A bicycle change-speed lever apparatus as defined in claim 6, wherein said engaging member comprises a spherical member.

8. A bicycle change-speed lever apparatus as defined in claim 1, wherein said control lever includes a control portion, a control lever element and a release lever element provided separately from and which move relative to each other across a shaft disposed at a longitudinally intermediate portion of the control lever element, said release lever element being positioned adjacent a free end of the control lever element while said control lever element is positioned adjacent a base end of the control portion, said release lever element being operable to actuate said release mechanism and being returnable by said return-urging means to a predetermined home position relative to said control lever element after each releasing operation.

9. A bicycle change-speed lever apparatus as defined in claim 8, wherein said shaft disposed at the longitudinally intermediate portion of the control lever element is oriented substantially normal to a support shaft of said release lever element.

10. A bicycle change-speed lever apparatus as defined in claim 9, wherein said shaft disposed at the longitudinally intermediate portion of the control lever element is oriented substantially normal to a longitudinally axis of said release lever element.

11. A bicycle change-speed apparatus as defined in claim 10, further comprising a limiting mechanism operatively connected with said release lever element for limiting an amount of pivotal motion of said winding member associated with the releasing operation.

12. A bicycle change-speed apparatus as defined in claim 11, wherein said limiting mechanism includes a plurality of stopper portions and a stopper piece which engages between an adjacent pair of said stopper portions so as to limit said pivotal amount of the winding member within one stepwise pitch.

13. A bicycle change-speed lever apparatus according to claim 1, wherein said control lever includes a first control face finger-operable for said pivotal motion within said first plane and a second control face finger-operable for said displacement within said second plane, said first control face and said second control face being disposed adjacent each other.

14. A bicycle change-speed lever apparatus according to claim 13, wherein said first plane and said second plane extend substantially normal to each other.

15. A bicycle change-speed apparatus as defined in claim 13, further comprising a limiting mechanism operatively connected with said release lever element for limiting an amount of pivotal motion of said winding member associated with the releasing operation.

16. A bicycle change-speed apparatus as defined in claim 15 wherein said limiting mechanism includes a plurality of stopper portions and a stopper piece which engages between an adjacent pair of said stopper portions so as to limit said pivotal amount of the winding member within one stepwise pitch.

17. A bicycle change-speed lever apparatus for use in a bicycle, said apparatus comprising:
a fixed member;
a change-speed cable;
a winding member supported on said fixed member so as to wind said change-speed cable;
a control lever for pivoting said winding member in a cable-winding direction when said control lever is operated in a forward direction for winding said change-speed cable,
a position-maintaining mechanism for maintaining said cable-winding member at one of a plurality of positions, said position-maintaining mechanism having an engaging member and a plurality of engaging portions which elastically engage with said engaging member; and
a release mechanism which releases a position-maintaining condition of said winding member by said position-maintaining mechanism;
wherein said control lever includes a control portion, a control lever element and a release lever element provided separately from and which move relative to each other across a shaft disposed at a longitudinally intermediate portion of the control lever element;
said shaft being oriented substantially normal to a support shaft of said release lever element and to a longitudinal axis of said control portion;
said release lever element being positioned adjacent a free end of the control lever element while said control lever element being positioned adjacent a base end of the control portion, said release lever element operates to actuate said release mechanism and being returnable by urging means to a home position predetermined relative to said control lever element after each releasing operation.

* * * * *